United States Patent
Lee et al.

(10) Patent No.: US 8,811,303 B2
(45) Date of Patent: Aug. 19, 2014

(54) METHOD OF PERFORMING WIRELESS COMMUNICATION IN MULTI-CARRIER SYSTEM

(75) Inventors: Young Dae Lee, Seoul (KR); Sung Duck Chun, Seoul (KR); Sung Jun Park, Seoul (KR); Seung June Yi, Seoul (KR)

(73) Assignee: LG Electronics Inc., Seoul (KR)

( * ) Notice: Subject to any disclaimer, the term of this patent is extended or adjusted under 35 U.S.C. 154(b) by 740 days.

(21) Appl. No.: 12/763,930

(22) Filed: Apr. 20, 2010

(65) Prior Publication Data

US 2010/0265905 A1    Oct. 21, 2010

Related U.S. Application Data

(60) Provisional application No. 61/171,440, filed on Apr. 21, 2009.

(30) Foreign Application Priority Data

Apr. 15, 2010 (KR) ........................ 10-2010-0034976

(51) Int. Cl.
*H04W 4/00* (2009.01)
*H04L 5/00* (2006.01)
*H04W 72/04* (2009.01)

(52) U.S. Cl.
CPC ......... *H04L 5/0037* (2013.01); *H04W 72/0406* (2013.01); *H04L 5/0007* (2013.01)
USPC ........................................................ 370/329

(58) Field of Classification Search
CPC . H04W 72/04; H04W 72/0446; H04W 74/04; H04W 88/02; H04W 72/0406; H04L 5/0037; H04L 5/0007
USPC ......... 370/310, 328, 329, 336, 345, 431, 436, 370/437, 441, 442; 455/403, 422.1, 450, 455/452.1, 462, 464
See application file for complete search history.

(56) References Cited

U.S. PATENT DOCUMENTS

| | | | |
|---|---|---|---|
| 2008/0198813 A1* | 8/2008 | Lu .................................. | 370/335 |
| 2010/0227569 A1* | 9/2010 | Bala et al. ...................... | 455/73 |
| 2010/0232373 A1* | 9/2010 | Nory et al. ..................... | 370/329 |
| 2010/0234037 A1* | 9/2010 | Terry et al. .................... | 455/450 |

* cited by examiner

*Primary Examiner* — Obaidul Huq
(74) *Attorney, Agent, or Firm* — Lee, Hong, Degerman, Kang & Waimey

(57) ABSTRACT

A method of a User Equipment (UE) performing wireless communication using multiple carriers comprises accessing a first carrier used for first link transmission, configuring a second carrier used for second link transmission, and performing the wireless communication using the second carrier. The second carrier is determined based on the first carrier.

10 Claims, 9 Drawing Sheets

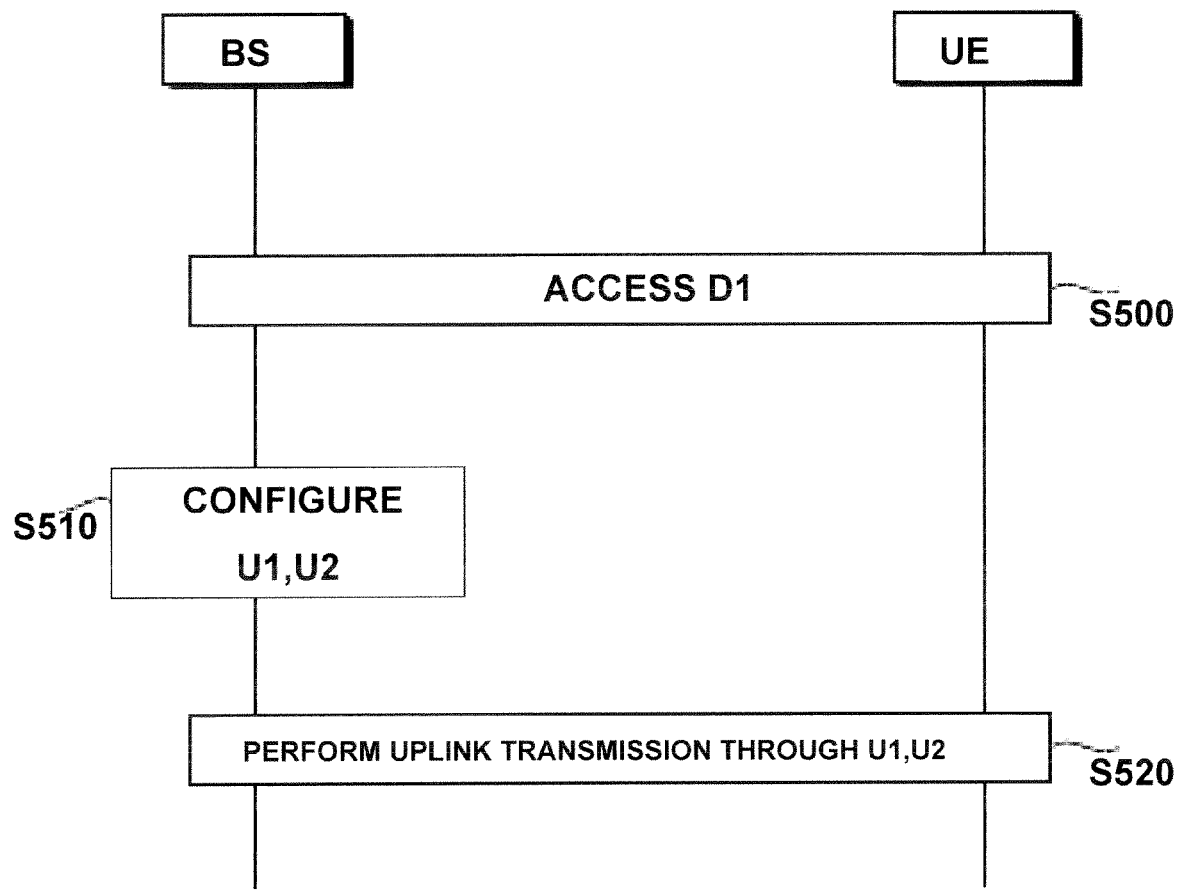

METHOD OF PERFORMING WIRELESS COMMUNICATION IN MULTI-CARRIER SYSTEM

CROSS-REFERENCE TO RELATED APPLICATIONS

Pursuant to 35 U.S.C. §119(e), this application claims the benefit of U.S. Provisional Patent Application No. 61/171,440 filed on Apr. 21, 2009, and pursuant to 35 U.S.C. §119(a), also claims the benefit of earlier filing date and right of priority to Korean Patent Application No. 10-2010-0034976 filed on Apr. 15, 2010, the contents of which are all hereby incorporated by reference herein in their entirety.

BACKGROUND

1. Field of the Invention

The present invention relates to wireless communications, and more particularly, to a method of performing wireless communication in a multi-carrier system.

2. Related Art

Wireless communication systems are widely spread all over the world to provide various types of communication services such as voice or data communication. In general, a wireless communication system is a multiple access system capable of supporting communication with multiple users by sharing available radio resources. Examples of multiple access systems include a time division multiple access (TDMA) system, a code division multiple access (CDMA) system, a frequency division multiple access (FDMA) system, an orthogonal frequency division multiple access (OFDMA) system, a single carrier frequency division multiple access (SC-FDMA) system, etc.

In a wireless communication system, one carrier is considered in general even if a bandwidth is differently set between an uplink and a downlink. In the 3rd generation partnership project (3GPP) long term evolution (LTE), one carrier constitutes each of the uplinks and the downlinks on the basis of a single carrier, and the bandwidth of the uplink is symmetrical to the bandwidth of the downlink. However, except for some areas of the world, it is not easy to allocate frequencies of wide bandwidths. Therefore, as a technique for effectively using fragmented small bands, a spectrum aggregation technique is being developed to obtain the same effect as when a band of a logically wide bandwidth is used by physically aggregating a plurality of bands in a frequency domain. The spectrum aggregation includes a technique for supporting a system bandwidth of 100 mega Hertz (MHz) by using multiple carriers even if, for example, the 3GPP LTE supports a bandwidth of up to 20 MHz, and a technique for allocating an asymmetric bandwidth between the uplink and the downlink.

In a multi-carrier system, to transmit and receive downlink data or uplink data or both, a downlink carrier or an uplink carrier or both has to be first configured. In a Frequency Division Duplex (FDD) system, downlink carriers are mapped to respective uplink carriers. Accordingly, if a wireless network changes a downlink carrier used to transmit data for a specific User Equipment (UE) to another downlink carrier, a corresponding uplink carrier has also to be changed. Further, if a wireless network changes an uplink carrier used to receive data from a specific UE to another uplink carrier, a corresponding downlink carrier has also to be changed. In this case, the downlink carrier and the corresponding uplink carrier have to be separately configured, which can cause the overhead for control information to be increased. Accordingly, there is a need for a method of reducing the overhead of control information in a multi-carrier system.

SUMMARY

The present invention has been devised in view of the above problems, and it is an object of the present invention to provide a method of performing communications, which is capable of reducing the overhead of configuration information by implicitly reconfiguring carriers in a multi-carrier system.

According to a first aspect of the present invention there is provided a method of performing wireless communication using multiple carriers between a User Equipment (UE) and a base station; the method comprising accessing a first carrier used for first link transmission, the first carrier being from among a plurality of first carriers; configuring a second carrier from among a plurality of second carriers for second link transmission; and performing wireless communication using the configured second carrier, wherein the second carrier is determined based on a mapping relationship with the first carrier, the mapping relationship mapping each of the second carriers to at least one first carrier of the plurality of first carriers; and wherein the first link transmission is one of an uplink transmission and a downlink transmission; and the second link transmission is the other of an uplink transmission and a downlink transmission.

A second aspect of the invention provides a user equipment (UE) for performing wireless communication with a base station wherein the UE can perform wireless communication with the base station on a plurality of uplink second carriers, the UE comprising: a transceiver for accessing a downlink first carrier used for downlink first link transmission from the base station; a processor for configuring an uplink second carrier, from among the plurality of uplink second carriers, for uplink second link transmission to the base station; the transceiver being configured to perform wireless communication to with the base station using the uplink second carrier; wherein the processor is configured to determine the uplink second link carrier based on a mapping relationship with the downlink first link carrier, the mapping relationship mapping each of the uplink second link carriers to at least one downlink first link carrier of a plurality of downlink first link carriers; and wherein the first link transmission is one of an uplink transmission and a downlink transmission, and the second link transmission is the other of an uplink transmission and a downlink transmission.

A third aspect of the invention provides a base station for performing wireless communication with a user equipment (UE) wherein the base station can perform wireless communication with the UE on a plurality of downlink second carriers, the base station comprising: a transceiver for accessing an uplink first carrier used for uplink first link transmission from the UE; a processor for configuring a downlink second link carrier for downlink second link transmission to the UE; the transceiver being configured to perform wireless communication to with the UE using the downlink second carrier; wherein the processor is configured to determine the downlink second carrier based on a mapping relationship with the uplink first carrier, the mapping relationship mapping each of the downlink second carriers to at least one uplink first carrier, and wherein the first link transmission is one of an uplink transmission and a downlink transmission, and the second link transmission is the other of an uplink transmission and a downlink transmission.

A fourth aspect of the present invention provides a method of a Base Station (BS) performing wireless communication with a user equipment using multiple carriers, the method comprising: transmitting to a UE pairing information indicating a mapping relation between a first carrier and a second carrier; transmitting to the UE configuration information concerning the first carrier to the UE; and performing the wireless communication with the UE using the first carrier and the second carrier.

In embodiments of the invention:

- each of the second carriers may be paired with a respective first carrier according to a one to one mapping relationship.
- the second carrier may be determined based on the index of the first carrier
- the method may further include a preceding step of receiving or transmitting mapping information indicating the mapping relation between each of the plurality of second carriers and a respective at least one first carrier wherein the second carrier is determined based on the received mapping information.
- the mapping information may be received or transmitted through a Broadcast Control Channel (BCCH), or a dedicated control channel (DCCH).

In accordance with embodiments of the present invention, in a multi-carrier system, there is no need to transmit configuration information about all the carriers. Accordingly, overhead resulting from the transmission of configuration information can be reduced.

BRIEF DESCRIPTION OF THE DRAWINGS

FIG. 9 is a flowchart illustrating a method of performing communication in a multi-carrier system according to yet another embodiment of the present invention.

DESCRIPTION OF EXEMPLARY EMBODIMENTS

Figure 1:
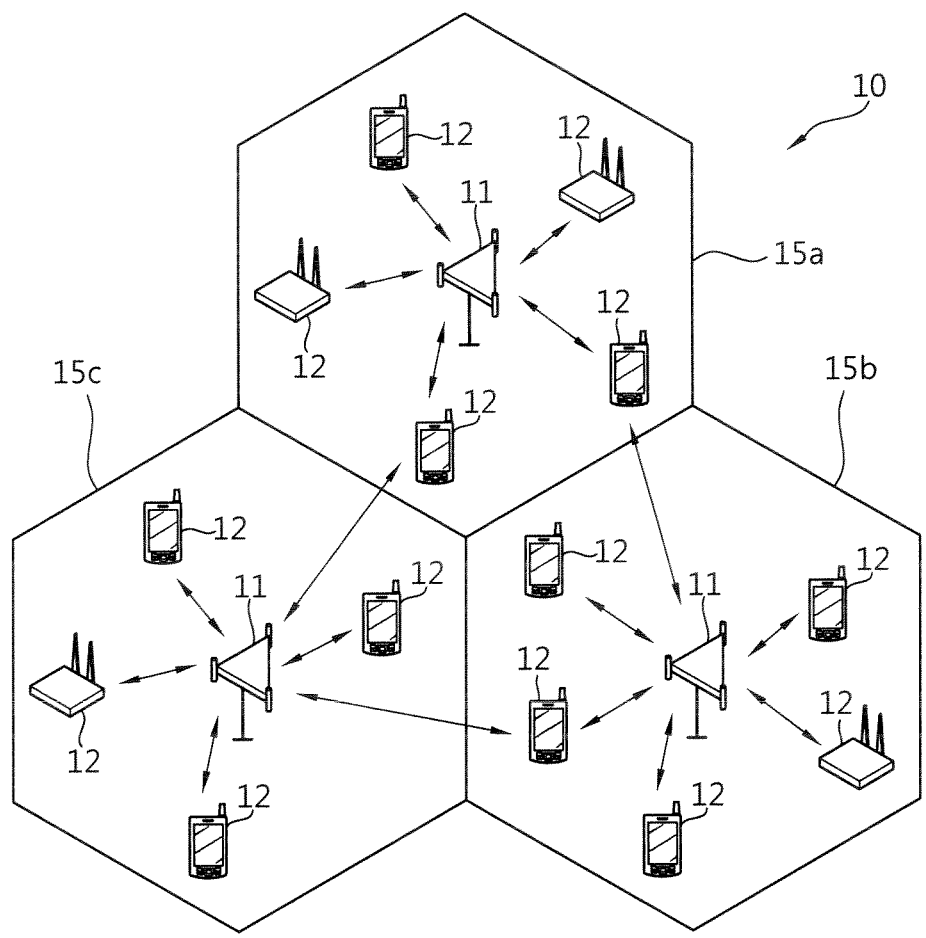
FIG. 1 schematically illustrates a wireless communication system.

FIG. 1 illustrates a wireless communication system. A wireless communication system 10 includes at least one base station (BS) 11. Each base station 11 provides a communication service to a particular geographical area 15a, 15b, or 15c (which are generally called cells). Each cell may be divided into a plurality of areas (which are also called sectors). A mobile station (MS) 12 may be fixed or mobile, and may be referred to by other names such as user equipment (UE), user terminal (UT), subscriber station (SS), wireless device, personal digital assistant (PDA), wireless modem, handheld device, etc. The BS 11 generally refers to a fixed station that communicates with the MS 12 and may be called by other names such as evolved-node B (eNB), base transceiver system (BTS), access point (AP), etc. Downlink (DL) refers to communication from the BS 11 to the MS 12, and uplink (UL) refers to communication from the MS 12 to the BS 11. In the downlink, a transmitter may be a part of the BS 11 and a receiver may be a part of the MS 12. In the uplink, a transmitter may be a part of the MS 12 and a receiver may be a part of the BS 11.

Spectrum aggregation (or bandwidth aggregation or a carrier aggregation) supports a plurality of carriers. A carrier is defined by a bandwidth and a center frequency. The spectrum aggregation is adopted to support increasing throughput, prevent an increase in a cost due to an introduction of a wideband radio frequency (RF) element, and guarantee compatibility with an existing system. For example, if four carriers are assigned as granularity of a carrier unit having a 5 MHz bandwidth, a maximum bandwidth of 20 MHz can be supported.

Spectrum aggregation may be divided into a contiguous spectrum aggregation and a non-contiguous spectrum aggregation. Contiguous spectrum aggregation uses contiguous carriers and the non-contiguous spectrum aggregation uses discontiguous carriers. The number of aggregated carriers may be different in uplink and downlink. When the number of downlink carriers and that of uplink carriers are equal, the aggregation is referred to as symmetric aggregation, and when the numbers are different, the aggregation is referred to as asymetric aggregation.

The size (i.e., the bandwidth) of aggregated multiple carriers may vary. For example, when five carriers are used to configure a 70 MHz band, they may be configured as 5 MHz carrier (carrier #0)+20 MHz carrier (carrier #1)+20 MHz carrier (carrier #2)+20 MHz carrier (carrier #3)+5 MHz carrier (carrier #4).

In the following description, a multi-carrier system refers to a system supporting multiple carriers based on spectrum aggregation. Contiguous spectrum aggregation and/or non-continuous spectrum aggregation may be used in the multi-carrier system, and in addition, either symmetrical aggregation or asymmetrical aggregation may be used.

Figure 2:
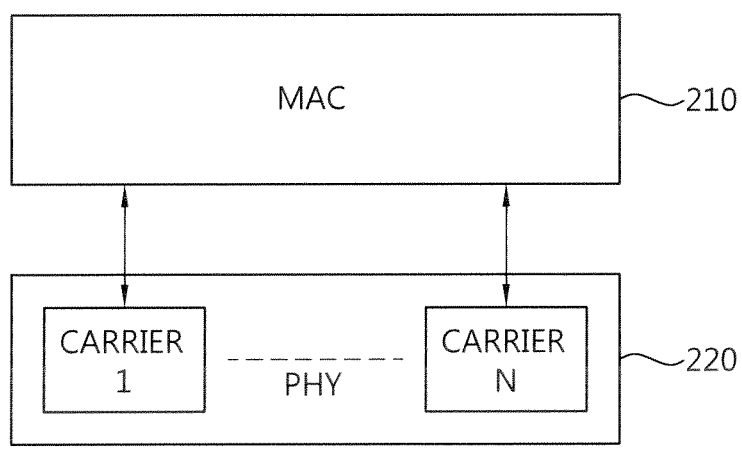
FIG. 2 illustrates an example of a protocol structure for supporting multiple carriers.

FIG. 2 illustrates an example of a protocol structure for supporting multiple carriers. A common medium access control (MAC) entity 210 manages a physical (PHY) layer 220 which uses a plurality of carriers. A MAC management message transmitted by a particular carrier may be applied to other carriers. The PHY layer 220 may operate in a TDD (Time Division Duplex) and/or FDD (Frequency Division Duplex) scheme.

There are several physical control channels used in the physical layer 220. A physical downlink control channel (PDCCH) may inform the UE about the resource allocation of paging channel (PCH) and downlink shared channel (DL-SCH), as well as hybrid automatic repeat request (HARQ) information related to DL-SCH. The PDCCH may carry the uplink scheduling grant which informs the UE about resource allocation of uplink transmission. A physical control format indicator channel (PCFICH) informs the UE about the number of OFDM symbols used for the PDCCHs and is transmitted in every subframe. A physical Hybrid ARQ Indicator Channel (PHICH) carries HARQ ACK/NAK signals in response to uplink transmissions. A physical uplink control channel (PUCCH) carries uplink control information such as HARQ AC/NAK in response to downlink transmission, scheduling request and channel quality indicator (CQI). A physical uplink shared channel (PUSCH) carries uplink shared channel (UL-SCH).

Figure 3:
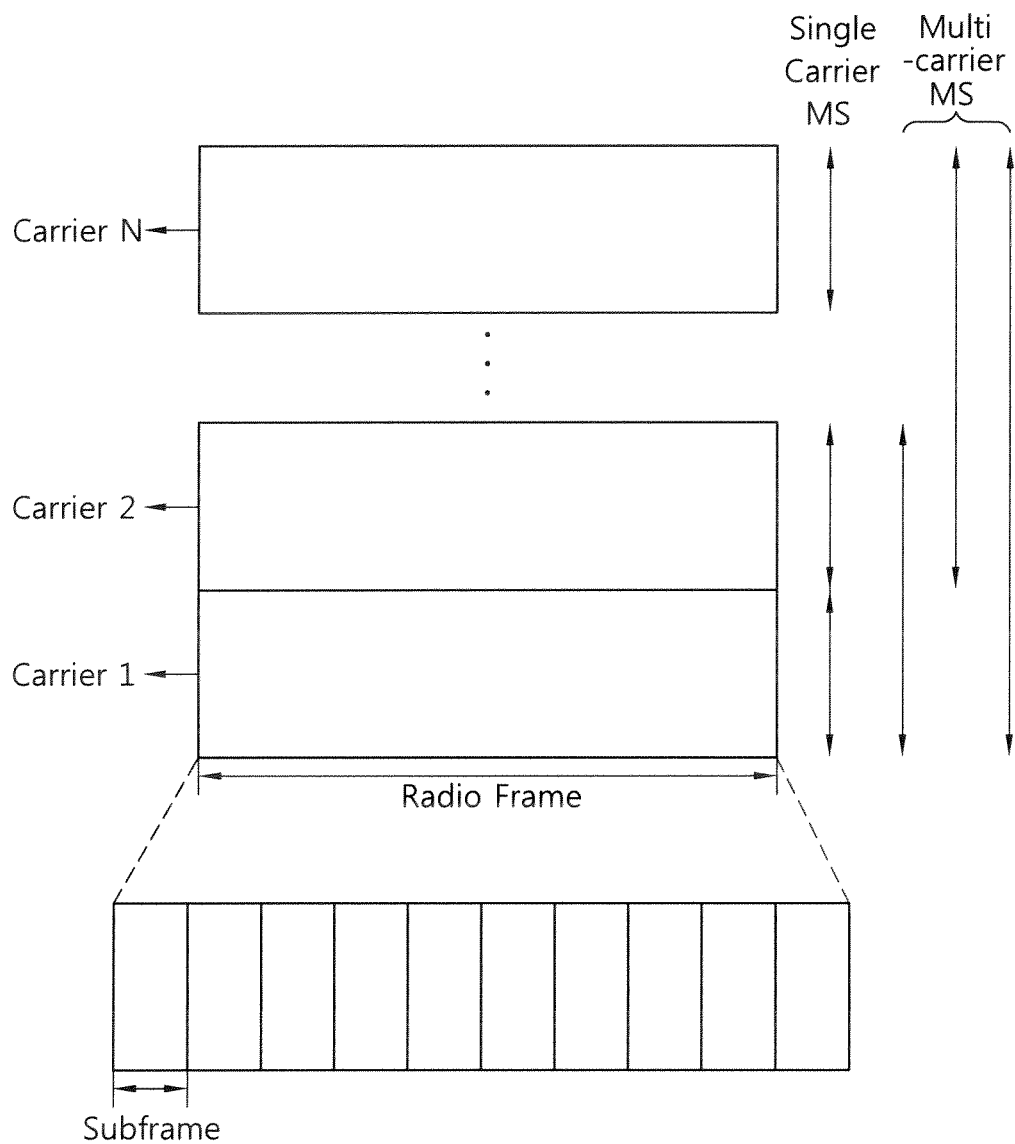
FIG. 3 schematically illustrates an example of a frame structure for operating multiple carriers.

FIG. 3 illustrates an example of a frame structure for operating multiple carriers. A radio frame includes 10 subframes. Each carrier may have its own control channel, i.e. PDCCH. Some carriers may have only a portion of the SFH. Multiple carriers may be or may not be contiguous to each other. An MS may support one or more carriers according to its capability.

Carriers may be divided into a fully configured carrier and a partially configured carrier depending on their directionality. A fully configured carrier refers to a bidirectional carrier that can transmit and/or receive every control signal and data, and a partially configured carrier refers to a unidirectional carrier that can transmit only downlink data. A partially configured carrier may be largely used for an MBS (Multicast and Broadcast Service) and/or an SFN (Single Frequency Network). A fully configured carrier is a standalone carrier for which all control channels including synchronization, broadcast, multicast and unicast control signaling are configured. The partially configured carrier is a carrier configured for downlink only transmission in TDD or a downlink carrier without paired UL carrier in FDD mode.

Carriers may be divided into a primary carrier and a secondary carrier depending on whether they are activated. The primary carrier refers to a carrier that is constantly activated, and the secondary carrier refers to a carrier that is activated or deactivated according to particular conditions. Activation means that transmission or reception of traffic data is performed or traffic data is ready for its transmission or reception. Deactivation means that transmission or reception of traffic data is not permitted. In the deactivation mode, measurements can be made or minimum information can be transmitted or received. The MS uses only a single primary carrier or one or more secondary carriers along with the primary carrier. The MS may be assigned the primary carrier and/or the second carriers by the BS. A primary carrier is a carrier used by a BS to exchange traffic and PHY/MAC control signaling (e.g., MAC control messages) with an MS. Secondary carriers are additional carriers which the MS may use for traffic, only per BS's specific commands and rules received on the primary carrier. The primary carrier may be a fully configured carrier, by which major control information is exchanged between the BS and the MS. The secondary carrier may be a fully configured carrier or a partially configured carrier, which is allocated according to a request of the MS or according to an instruction of the BS. The primary carrier may be used for entering of the MS into a network or for an allocation of the secondary carrier. The primary carrier may be selected from among fully configured carriers, rather than being fixed to a particular carrier. A carrier set as the secondary carrier may be changed to a primary carrier.

Hereinafter, a downlink carrier refers to a carrier used for downlink transmission, and an uplink carrier refers to a carrier used for uplink transmission. In a Frequency Division Duplex (FDD) system, downlink carriers are mapped to respective uplink carriers. Accordingly, if a wireless network changes a downlink carrier used to transmit data for a specific UE to another downlink carrier, a corresponding uplink carrier has also to be changed. Further, if a wireless network changes an uplink carrier used to receive data for a specific UE to another uplink carrier, a corresponding downlink carrier has also to be changed. In this case, the downlink carrier and the corresponding uplink carrier have to be separately configured, which can cause the overhead for control information.

Figure 4:
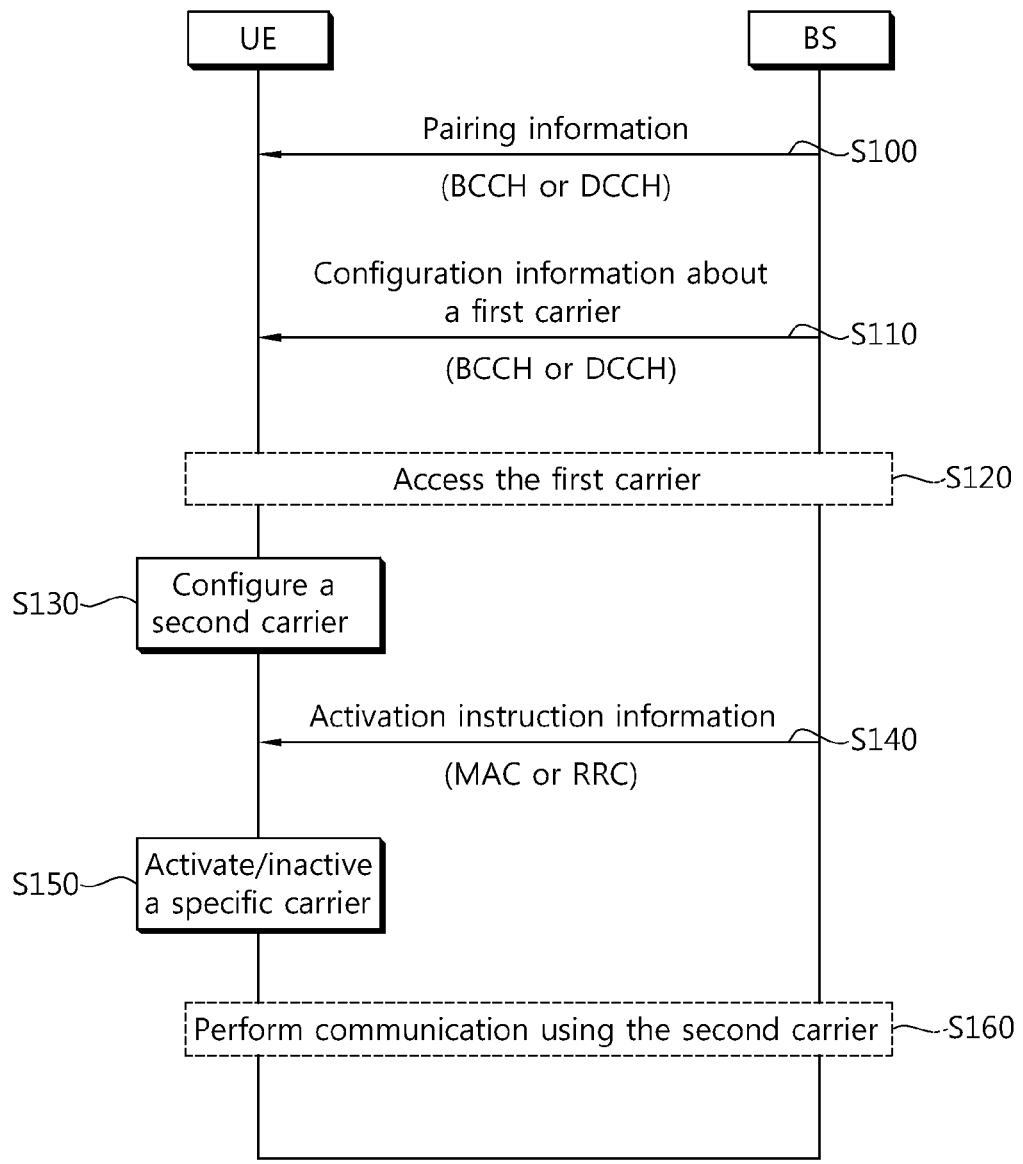
FIG. 4 is a flowchart illustrating a method of performing communication in a multi-carrier system according to an embodiment of the present invention.

FIG. 4 is a flowchart illustrating a method of performing communication in a multi-carrier system according to an embodiment of the present invention.

Referring to FIG. 4, a UE receives pairing information, indicating a mapping relation between a first carrier used for first link transmission and a second carrier used for second link transmission, from a Base Station (BS) at step S100. The pairing information indicates the mapping relation between the first carrier and the second carrier can thus be determined depending on the first carrier. For example, assuming that there are a plurality of first carriers U1, U2, and U3 and a plurality of second carriers D1, D2, and D3, pairing information can be configured as in {U1, D1}, {U2, D2}, and {U3, D3}. Here, {x, y} refers to that the carrier x and the carrier y have a mapping relation, and Ui and Di (i=1, 2, 3) indicate the indices of carriers. If U1 is determined as the first carrier, the second carrier is determined as D1. Further, if U3 is determined as the first carrier, the second carrier is determined as D3. The pairing information is transmitted through a Broadcast Control Channel (BCCH) or a Dedicated Control Channel (DCCH). The pairing information can be an RRC message generated by an RRC layer.

Next, the UE receives configuration information for the first carrier from the BS at step S110. The configuration information is used by a UE and a BS in order to configure radio access to a specific carrier in a multi-carrier system. The configuration information can be transmitted through a BCCH or a DCCH and can be an RRC message.

The UE accesses the first carrier used for first link transmission at step S120. Here, the first link transmission can be uplink transmission or downlink transmission. In the case in which the first link transmission is uplink transmission from the UE to the BS, the first carrier is an uplink carrier. In the case in which the first link transmission is downlink transmission from the BS to the UE, the first carrier is a downlink carrier. Here, the term 'access' can include several meanings. For example, the access can refer to that a UE camps on a specific cell or a specific carrier, or that a UE is transmitting or receiving specific data.

Next, the UE configures the second carrier used for second link transmission at step S130. Here, the second carrier is determined on the basis of the first carrier in accordance with the pairing information. That is, when the first carrier is determined, the second carrier is determined depending on the first carrier. The number of second carrier mapped to the first carrier can be one or more. For example, in the case in which the pairing information is {U1, D2, and D3}, if U1 is configured, two carriers D2 and D3 can be configured. In either case, if the UE knows the first carrier and the second carrier mapped to the first carrier, the UE can configure the second carrier without a request of the BS to configure the second carrier. To configure the second carrier on the basis of the mapping relation is also called implicit configuration. If the BS does not want perform such implicit configuration, the BS can indicate the configuration of a specific downlink carrier (or an uplink carrier) and, at the same time, instruct the UE to exclude the implicit configuration for a mapped uplink carrier (or a downlink carrier).

The second link transmission can be uplink transmission or downlink transmission. If, at step S120, the first link transmission is an uplink transmission, the second link transmission is downlink transmission, and the second carrier is a downlink carrier. However, if, at step S120, the first link transmission is the downlink transmission, the second link transmission is uplink transmission, and the second carrier is an uplink carrier. That is, the first link transmission and the second link transmission have opposite directions.

The UE receives activation instruction information on a specific carrier from the BS at step S140. The activation refers to that the transmission or reception of traffic data is being performed or in a ready state. Inactivation refers to that the transmission or reception of traffic data is not permitted, but that measurement or the transmission or reception of minimum information is possible. Accordingly, when the BS sends the activation instruction information for activating (or inactivating) a specific carrier to the UE, the UE activates (or inactivates) the specific carrier on the basis of the activation instruction information at step S150. The activation instruction information can be a MAC control element or an RRC message. If the BS does not want implicit activation, the BS may indicate the activation of a specific downlink carrier (or an uplink carrier) and, at the same time, instruct the UE to exclude the implicit activation of a mapped uplink carrier (or a mapped downlink carrier).

After the second carrier has been configured, the UE performs communication using the second carrier at step S160. If the second carrier is a downlink carrier, the UE performs downlink reception from the BS. On the contrary, if the second carrier is an uplink carrier, the UE performs uplink transmission to the BS.

The BS can release a configured carrier through a carrier aggregation configuration message. If the BS releases D1, the UE releases not only D1, but also U1 mapped to D1.

Figure 5:
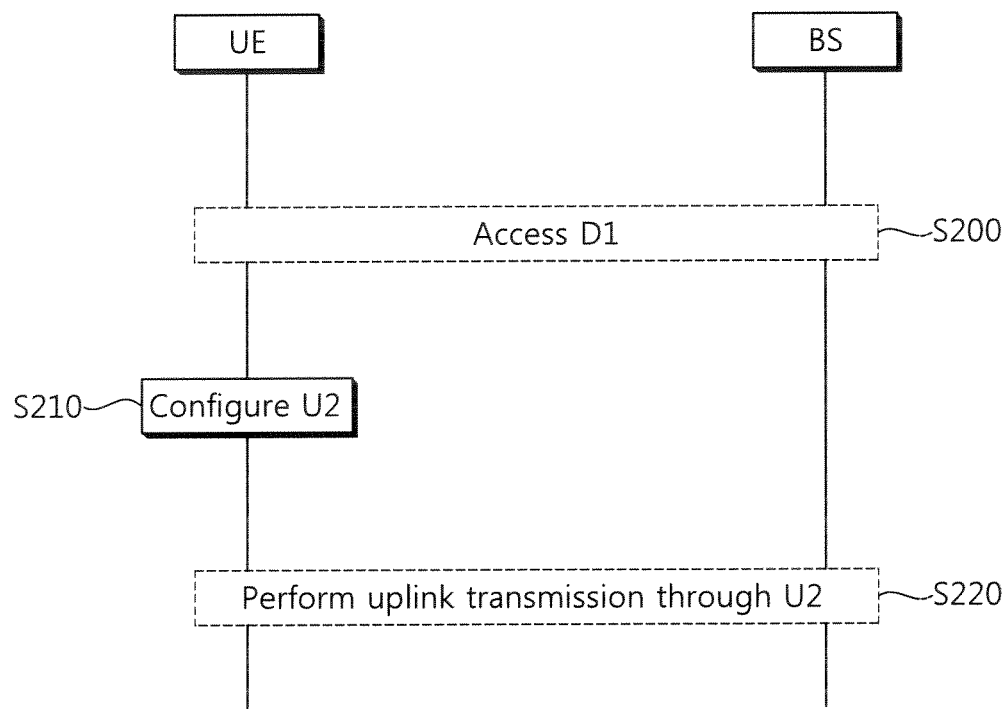
FIG. 5 is a flowchart illustrating a method of performing communication in a multi-carrier system according to another embodiment of the present invention.

FIG. 5 is a flowchart illustrating a method of performing communication in a multi-carrier system according to another embodiment of the present invention. FIG. 5 shows an example in which a first carrier is a downlink carrier and a second carrier is an uplink carrier.

Referring to FIG. 5, a UE accesses a downlink carrier D1 at step S200. The downlink carrier is used for downlink transmission. The UE receives downlink data using the downlink carrier D1. It is assumed that the UE has received pairing information {D1, U2} before accessing the downlink carrier D1. U2 is an index of an uplink carrier. The UE configures the uplink carrier U2 mapped to the downlink carrier D1 at step S210. The UE performs uplink transmission using the uplink carrier U2 at step S220. The UE has received only the configuration information on the downlink carrier D1, but has not received configuration information on the uplink carrier U2. Since the UE already knows the uplink carrier U2 mapped to the downlink carrier D1 on the basis of the pairing information, the UE can configure the uplink carrier U2 even without an additional configuration instruction from the BS. Accordingly, the overhead for the configuration information can be reduced.

Figure 6:
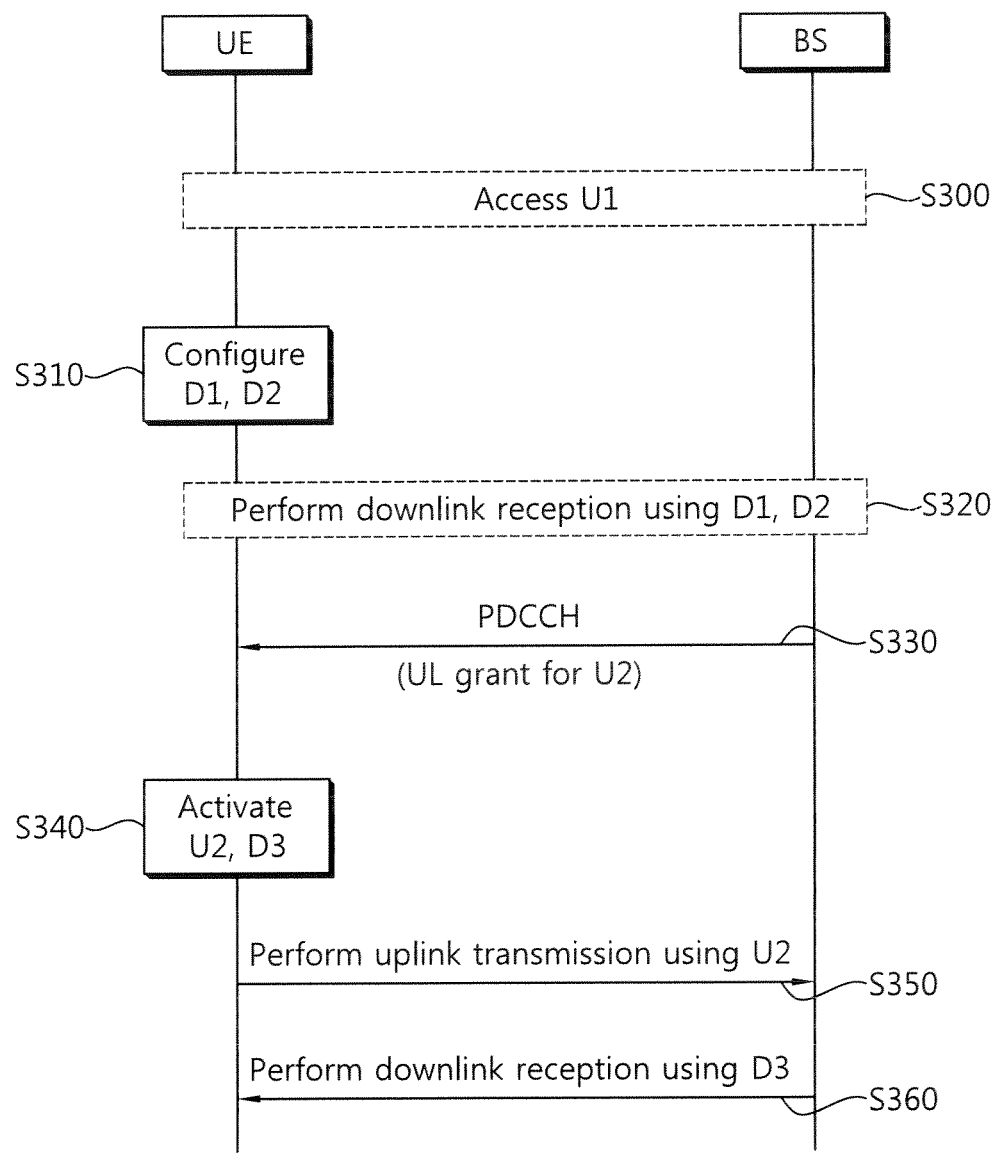
FIG. 6 is a flowchart illustrating a method of performing communication in a multi-carrier system according to yet another embodiment of the present invention.

FIG. 6 is a flowchart illustrating a method of performing communication in a multi-carrier system according to yet another embodiment of the present invention. FIG. 6 shows an example in which a first carrier is an uplink carrier and a second carrier is a downlink carrier.

Referring to FIG. 6, a UE accesses an uplink carrier U1 at step S300. The uplink carrier is used for uplink transmission. The UE sends uplink data to a BS through the uplink carrier. It is assumed that the UE has received pairing information {U1, D1, D2} before accessing the uplink carrier U1. D1 and D2 are indices of respective downlink carriers. The UE configures the downlink carriers D1 and D2 mapped to the uplink carrier U1 without receiving configuration information on D1 and D2 at step S310. The UE performs downlink reception from the BS using the downlink carriers D1 and D2 at step S320.

It is assumed that another piece of pairing information {U2, D3} exists. In the case in which the radio resources of an uplink carrier U2 is assigned to the UE through the PDCCH of the downlink carriers D1 and D2 at step S330, the UE activates not only the uplink carrier U2, but also a downlink carrier D3 mapped to the uplink carrier U2 at step S340, performs uplink transmission to the BS through the uplink carrier U2 at step S350, and performs downlink reception from the BS through the downlink carrier D3 at step S360.

Figure 7:
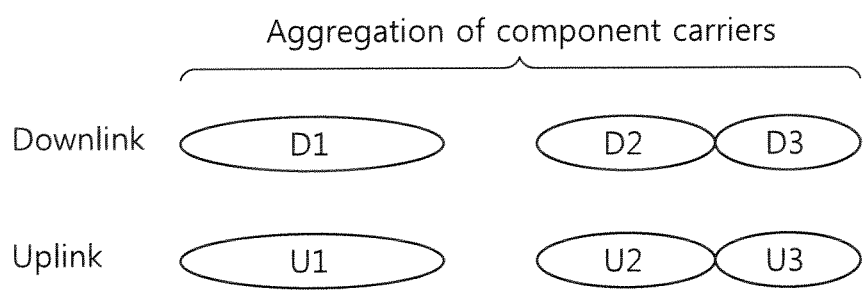
FIG. 7 shows a mapping relation indicated by pairing information according to the present invention.

FIG. 7 shows a mapping relation indicated by pairing information according to the present invention.

Referring to FIG. 7, in a FDD system, downlink carriers are mapped to respective uplink carriers. D1 is mapped to U1, D2 is mapped to U2, and D3 is mapped to U3. A BS can designate D1, D2, and D3 as an aggregation of downlink carriers and U1, U2, and U3 as an aggregation of uplink carriers. A UE checks a correspondence and a mapping relation between the downlink carriers and the uplink carriers on the basis of system information transmitted by a logical channel BCCH or a UE-dedicated RRC message transmitted by a logical channel DCCH. Although the one-to-one mapping relation between the downlink carriers and the uplink carriers is illustrated in FIG. 7, the downlink carriers and the uplink carriers can have a mapping relation of 1:n or n:1. i.e. a downlink carrier can be mapped to one or more uplink carriers and an uplink carrier can be mapped to one or more downlink carriers. In general, downlink transmission requires a wider bandwidth than uplink transmission. Accordingly, in the case in which a BS instructs the configuration or activation of a specific carrier, a specific downlink carrier and a corresponding uplink carrier can be implicitly configured or cannot be activated together with consideration taken of downlink transmission requiring a wider bandwidth than uplink transmission. Only when the BS instructs the configuration or activation of a specific uplink carrier, the specific uplink carrier and a corresponding downlink carrier can be implicitly configured or activated together. Accordingly, in the case in which a BS wants to configure or activate a specific downlink carrier and, at the same time, configure or activate an uplink carrier mapped to the specific downlink carrier together, the BS must explicitly instruct a UE to configure or activate the mapped uplink carrier.

Figure 8:
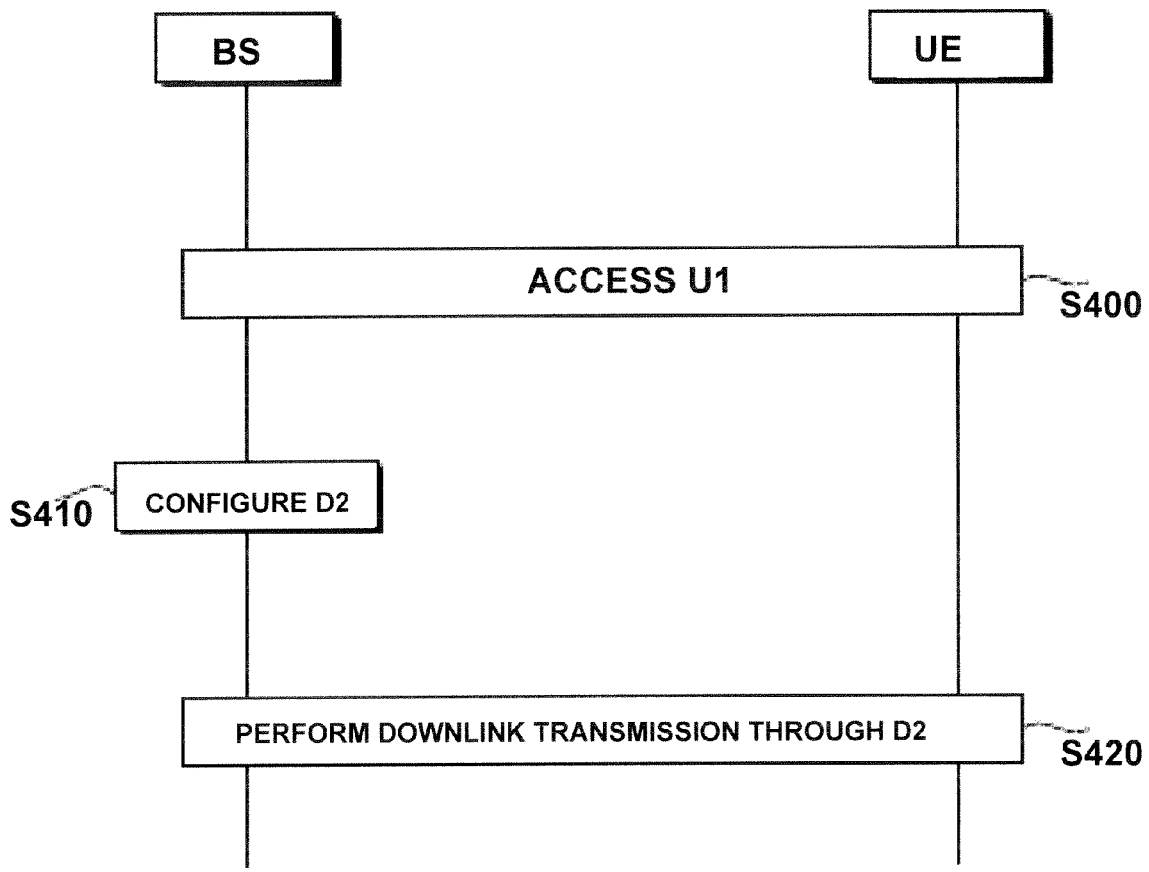
FIG. 8 is a flowchart illustrating a method of performing communication in a multi-carrier system according to another embodiment of the present invention.

A further embodiment of the invention will now be described with reference to FIG. 8. A base station accesses an uplink carrier U1 at step S400. The uplink carrier is used for uplink transmission from a UE to the BS. The BS receives uplink data using the uplink carrier U1. It is assumed that the BS has pairing information {U1, D2} mapping uplink carrier U1 to downlink carrier D2. D2 is an index of an downlink carrier. The BS configures the downlink carrier D2 mapped to the uplink carrier U1 at step S410. The BS performs downlink transmission using the downlink carrier D2 at step S420. Since the BS already knows the downlink carrier D2 mapped to the uplink carrier U1 on the basis of the pairing information, the BS can configure the downlink carrier D2 without additional signaling information from the UE. Accordingly, the overhead for the configuration information can be reduced.

FIG. 9 is a flowchart illustrating a method of performing communication in a multi-carrier system according to yet another embodiment of the present invention. FIG. 9 shows an example in which a first carrier is a downlink carrier and a second carrier is a uplink carrier.

Referring to FIG. 9, a BS accesses an downlink carrier D1 at step S500. The downlink carrier is used for downlink transmission. The BS sends downlink data to a UE through the downlink carrier. It is assumed that the BS has pairing information {D1, U1, U2} relating downlink carriers and uplink carriers. U1 and U2 are indices of respective uplink carriers. The BS configures the uplink carriers U1 and U2 mapped to the downlink carrier D1 without receiving configuration information on U1 and U2 at step S510. The BS performs uplink reception from the UE using the downlink carriers U1 and U2 at step S520. While the invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

All functions described above may be performed by a processor such as a microprocessor, a controller, a microcontroller, and an application specific integrated circuit (ASIC) according to software or program code for performing the functions. The program code may be designed, developed, and implemented on the basis of the descriptions of the present invention, and this is well known to those skilled in the art.

While the present invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. A method of performing wireless communication using multiple carriers between a User Equipment (UE) and a base station, the method performed by the UE and comprising:
    receiving pairing information indicating a mapping relationship between a first carrier used for first link transmission and a second carrier used for second link transmission from the base station, the first carrier being one of an aggregation of first carriers, and the second carrier being one of an aggregation of second carriers;
    receiving configuration information for the first carrier from the base station after receiving the pairing information, wherein the configuration information is used to configure radio access to the first carrier among the multiple carriers including the first carrier and the second carrier;
    accessing the first carrier used for the first link transmission based on the configuration information;
    configuring the second carrier for the second link transmission based on the first carrier according to the mapping relationship indicated by the pairing information;
    performing the wireless communication using the configured second carrier; and
    releasing the first carrier together with the configured second carrier through a carrier aggregation configuration message which indicates release of the first carrier,
    wherein the first link transmission is one of an uplink transmission and a downlink transmission and the second link transmission is the other one of the uplink transmission and the downlink transmission.

2. The method of claim 1, wherein the second carrier is paired with a respective first carrier according to a one-to-one mapping relationship.

3. The method of claim 1, wherein the second carrier is configured based on an index of the first carrier.

4. The method of claim 1, further comprising:
    receiving activation instruction information on a specific carrier from the base station.

5. The method of claim 1, wherein the pairing information is received through a Broadcast Control Channel (BCCH) or a dedicated control channel (DCCH).

6. A user equipment (UE) for performing wireless communication with a base station, the UE comprising:
    a transceiver configured for transmitting or receiving a radio signal; and
    a processor coupled to the transceiver and configured for:
        receiving pairing information indicating a mapping relationship between a first carrier used for first link transmission and a second carrier used for second link transmission from the base station, the first carrier being one of an aggregation of first carriers, and the second carrier being one of an aggregation of second carriers;
        receiving configuration information for the first carrier from the base station after receiving the pairing information, wherein the configuration information is used to configure radio access to the first carrier among multiple carriers including the first carrier and the second carrier;
        accessing the first carrier used for the first link transmission based on the configuration information;
        configuring the second carrier for the second link transmission based on the first carrier according to the mapping relationship indicated by the pairing information;
        performing the wireless communication using the configured second carrier; and
        releasing the first carrier together with the configured second carrier through a carrier aggregation configuration message which indicates release of the first carrier,
    wherein the first link transmission is one of an uplink transmission and a downlink transmission, and the second link transmission is the other one of the uplink transmission and the downlink transmission.

7. The user equipment of claim 6, wherein the second link carrier is paired with a respective first link carrier according to a one-to-one relationship.

8. The user equipment of claim 6, wherein the second link carrier is configured based on an index of the first link carrier.

9. The user equipment of claim 6, wherein the transceiver is configured to receive activation instruction information on a specific carrier from the base station.

10. The user equipment of claim 6, wherein the transceiver is further configured for receiving the pairing information through a Broadcast Control Channel (BCCH) or a dedicated control channel (DCCH).

* * * * *